United States Patent [19]

Romesberg et al.

[11] 4,252,846

[45] Feb. 24, 1981

[54] PACKAGES EMBODYING A CONTROLLED PEEL SEAL AND METHOD OF PREPARING SAME

[75] Inventors: Floyd E. Romesberg; Frank V. Goff, both of Midland, Mich.

[73] Assignee: The Dow Chemical Company, Midland, Mich.

[21] Appl. No.: 615,654

[22] Filed: Sep. 22, 1975

[51] Int. Cl.$^3$ .................. B32B 27/08; B65D 73/00
[52] U.S. Cl. .................. 428/35; 206/484; 206/631; 156/332; 156/334; 220/410; 229/3.5 R; 428/515; 428/520
[58] Field of Search ............ 428/35, 515, 520, 522, 428/523; 229/48 T, 66, 51 WB, 3.5 R; 156/332, 334, 247; 220/410; 206/631, 632, 633, 484

[56] References Cited

U.S. PATENT DOCUMENTS

| | | | |
|---|---|---|---|
| 3,496,061 | 2/1970 | Freshour et al. | 428/516 |
| 3,540,962 | 11/1970 | Anzawa et al. | 428/520 |
| 3,560,420 | 2/1971 | Tamura et al. | 156/334 |
| 3,595,468 | 7/1971 | Repko | 229/66 |
| 3,617,419 | 11/1971 | Fischer | 156/334 |
| 3,620,435 | 11/1971 | Sogi | 428/515 |
| 3,682,767 | 8/1972 | Britton et al. | 428/520 |
| 3,708,388 | 1/1975 | Lindemann et al. | 428/520 |
| 3,725,124 | 4/1973 | Gorton | 428/515 |
| 3,734,798 | 5/1973 | Dooley | 428/515 |
| 3,817,821 | 6/1974 | Gallini | 428/516 |
| 4,188,441 | 2/1980 | Cook | 428/520 |

*Primary Examiner*—William R. Dixon, Jr.
*Attorney, Agent, or Firm*—Tai-Sam Choo

[57] ABSTRACT

Heat seals of closely controlled peel strengths are obtained utilizing a heat seal layer comprising essentially a blend of an ethylene vinyl acetate copolymer and a high density ethylene homopolymer, wherein a sealing temperature is employed adapted to activate the copolymer to seal, but insufficient to activate the homopolymer. Film packages prepared according to the invention may embody an easy opening peel seal achieved by sealing in the above-defined temperature range, and much stronger seals in other areas of the package achieved using the same heat seal layer, but a higher sealing temperature generally nearer the crystalline melting point of the homopolymer constituent.

2 Claims, No Drawings

PACKAGES EMBODYING A CONTROLLED PEEL SEAL AND METHOD OF PREPARING SAME

FIELD OF THE INVENTION

The invention relates to film packages and methods of preparing same. More specifically the invention relates to film packages having peel seals of closely controlled seal strength, and methods which permit the expedient manufacture of such packages, and particularly packages including a selective low strength peel seal, together with much stronger seals in other parts of the package structure, to provide packages of optimum fitness and convenience for consumer use.

BACKGROUND OF THE INVENTION

Optimum peel seals are those which may be obtained over a wide sealing temperature range, with minimum variance in the seal value from a control or selected peel strength, and most preferably seals which may be obtained at relatively low sealing temperatures. Thermoplastic films of otherwise desirable attributes for commercial film packages typically do not meet this criteria. Frequently, for example, conventional packaging films exhibit the extremes of a "seal" or "no seal" response to conventional heat sealing techniques. High density polyethylene and many ethylene vinyl acetate copolymers generally fall into this characterization. As such these materials are incapable of providing closely controlled peel strengths except possibly by means of extremely delicate temperature controls which are oftentimes impractical for commercial production.

Ethylene vinyl acetate copolymers have heretofore been utilized, however, in blended form with very high melt index materials such as various waxes, or other ethylene vinyl acetate copolymers of high vinyl acetate content, to provide a sealing layer adapted to the formation of low strength peel seals. Generally, however, unmodified ethylene vinyl acetate copolymers, with desirable concentrations of from about 15 to 35 weight percent vinyl acetate have not been accepted as a good peel seal forming materials, particularly where a peel seal strength of less than about 1 pound per linear inch is desired for the package structure.

Moreover, the addition of such high melt index modifiers does not provide a satisfactory solution in that the modified material is oftentimes very difficult to coextrude in laminar form with other plastics, and also the resultant film may have poor machining characteristics because of the "tacky" or high friction surface typically induced by modifiers of this type.

Accordingly, it would be of advantage if there were available a method for preparing peel seals utilizing heat seal layers blended for improved machining and handling characteristics, efficient coextrudability with various film substrate materials, and which provided close control over the peel strength of the seal at low sealing temperatures, and with sufficient latitude in the effective sealing temperature range to be well adapted for the commercial production of film packages.

It would be of even further advantage to have available such a method wherein packages may be prepared with a combination of peel and high seal strength seals, achieved using a common heat seal layer material, but at distinct sealing temperature ranges, each such sealing temperature range permiting an error of at least about plus or minus 10° F. from the control sealing temperature, to thereby obtain reliable controlled seal strengths without requiring excessively delicate controls over the temperature of the apparatus forming the seals.

It would be of further advantage to the art to have available film packages exhibiting closely controlled peel seal strengths, yet requiring generally unsophisticated sealing temperature controls for their manufacture, and yet additionally packages which may be expediently manufactured exhibiting low strength peel seals, such as along one edge for easy opening, and higher strength, more durable seals along the remaining sealed portions of the package.

These benefits and other cognate advantages are achieved through:

(I) The method of the invention for forming peel seals comprising the steps of utilizing therefor a film comprising at least a two layered laminar structure embodying a substrate layer having intimately adhered to one surface thereof a heat seal layer, the heat seal layer comprising essentially a blend of not less than about 10 and up to about 60 parts by weight of an ethylene homopolymer having a density of between about 0.93 to 0.98 gm/cc, and not less than about 30 and up to about 60 parts by weight of a copolymer of from about 65 to 85 weight percent ethylene and from about 15 to 35 weight percent vinyl acetate, bringing opposed portions of the film into contact under pressure with the heat seal layer of such portions positioned in face to face contact, and applying a sealing temperature to the film above the sealing temperature of the copolymer constituent, but less than the crystalline melting point of the homopolymer constituent to effect a seal strength between said opposed portions of about 1 pound per linear inch in strength or less.

(II) The package of the invention comprising a flexible package fabricated at least in part from a flexible film comprising at least two layers in intimately adhered laminar form, including a substrate layer having intimately adhered to one surface thereof a heat seal layer prepared from a homogeneous blend comprising essentially not less than about 10 and not greater than about 60 parts by weight of an ethylene homopolymer having a density of from between about 0.93 to about 0.98 gms/cc, and not less than about 30 and not greater than about 60 parts by weight of a copolymer of from about 65 to 85 weight percent ethylene and from about 15 to 35 weight percent vinyl acetate, opposed portions of such film being joined by a pressure and heat induced seal utilizing the heat seal layer of each such portion, said seal being characterized by a peel strength in the range from between about 0.1 and about 1.0 pound per linear inch.

DETAILED DESCRIPTION OF THE INVENTION

The laminar film structures utilized in the invention are prepared using a substrate of at least one layer, preferably between about 1 to 5 mils in thickness, and selected to provide the essential attributes desired of the film package. It is particularly desirable in formulating film for use as liners for cereal boxes, for example, to provide a film of relatively high modulus or stiffness. A most advantageous form of the invention as regards this aspect comprises a relatively stiff substrate layer prepared from a high density ethylene homopolymer having a density of from between about 0.93 to about 0.98 g/cc, and preferably from between about 0.945 to about 0.965 g/cc, and a melt index of from between about 0.2 to about 10. A generally stiff packaging film may also be prepared using substrate layers formulated from substantially homogeneous blends of high and low density ethylene homopolymers, for example, wherein the high density component comprises at least a significant part of the blend such as at least up to about 25 parts by weight thereof.

The substrate materials may be combined by known coating or coextrusion techniques with various heat seal layers as are now described. The thickness of the heat seal layer is advantageously in a range from between about 0.1 to about 0.5 mils. A thin seal coating is especially desirable, for example, to keep the modulus of the film high and to achieve lower material costs. Very thin coatings, however, may be expected to give somewhat weaker peel strengths than that reported hereinafter.

The heat seal layer comprises a substantially homogeneous film forming, heat sealable blend or admixture of at least two constituents of markedly different sealing characteristics. The first constituent of the blend comprises a copolymer of from about 65 to about 85 weight percent ethylene and from about 15 to about 35 weight percent vinyl acetate. Most preferable the vinyl acetate content is in the range of from about 25 to about 30 weight percent. For films that are to be manufactured by coextrusion it is critical that the ethylene vinyl acetate constituent have a melt index of between about 0.5 and 15 and most desirable between about 2 and 8.

The second constituent or modifier comprises essentially a film forming ethylene homopolymer, having a density of from between 0.93 to about 0.98, and preferably between about 0.945 to about 0.965, and a melt index of from between about 0.5 to 15 and most preferably in the range of about 2 to about 8.

The heat seal layer is prepared from a substantially homogeneous blend of the described first and second constituents wherein the blend comprises essentially not less than about 10 and not greater than about 60 parts by weight of the homopolymer constituent, and not less than about 30 and not greater than about 60 parts by weight of the copolymer constituent. Most advantageously the heat seal layer is prepared from a blend in the preferred range comprising essentially from between about 35 to about 55 parts by weight of the homopolymer constituent, and from between about 45 to about 60 parts by weight of the copolymer constituent.

The optimum weight percent of the homopolymer constituent in the blend may vary considerably within the limits of the defined range since it is possible to substitute at least partly therefor other heat sealable polymeric materials and compositions characterized by having a minimum heat sealing temperature of at least about 50° F. higher that the minimum heat sealing temperature of the ethylene vinyl acetate copolymer constituent. Low density polyethylene homopolymers and ethylene vinyl acetate copolymers of low vinyl acetate content, preferably less than about 10 weight percent vinyl acetate, are non-limiting examples of preferred materials which may be used as a partial substitute for the high density ethylene homopolymers. A blended modifier constituent within the parameters described may comprise essentially from between about 35 to about 60 parts by weight of the blend, and preferably about 45 to 55 parts by weight thereof, including in these ranges the weight percent of the high density ethylene homopolymer present.

It is sometimes desirable to add further materials to the heat seal composition to achieve specific end results for a given process or packaging application. For example, it has sometimes been found advantageous to add a Surlyn ®️ ionomer or a polybutylene, or an equivalent material to the blend in order to achieve greater "hot tack" strength in the seal, such as for preparing packages wherein the hot seals are to be subjected to generally immediate stress. Further, generally up to about 10 parts by weight of the composition of the heat seal layer may permissibly comprise slip or anti-block additives or concentrates, or such other additives or concentrates desired to modify, for example, the surface characteristics of the film.

The described heat sealing layers using controlled sealing temperatures can provide highly controlled and reproducible peel seals ranging beneficially from about 0.1 to about 1.0 pound per linear inch in peel strength. These closely controlled peel strengths moreover are available at a commercially accepted sealing range having a permissible latitude of at least about 10° F. from the control temperature.

The invention is further illustrated by the samples reported in Tables I and II below. Table I gives data regarding seal performance. Table II describes the composition of the heat seal coatings. The samples reported are prepared by the known blown film process using a two layered die to coextrude the substrate and heat seal layer simultaneously. The extrudate rate is approximately 3.9 pounds per hour for the heat seal layer and 15.6 pounds per hour for the substrate. The blow-up ratio is about 2.8:1. The die temperature is controlled at approximately 370° F. The die gap is approximately 0.030 inches, and a film thickness of approximately 2 mils is produced utilizing a film windup speed of about 15 feet per minute.

The film samples after being prepared according to the foregoing conditions are heat sealed employing a Sentinal heat sealer using an impulse heated bar to form seals of approximately ¾ inch in width. The heat seals are prepared by sealing opposite layers of the film samples together with the heat seal layers of such portions being in face to face contact and under pressure of approximately 30 lbs./sq. in. One inch wide strips are cut from the sample specimens and tested on an Instron testing unit using a cross-head speed of 5 in./min. to define the peel strength rating of the film. The seals tested are formed under two sets of conditions, i.e., a first condition utilizing a sealing temperature range below the crystalline melting point of the homopolymer constituent and above the sealing temperature of the copolymer constituent. The second condition utilizes a sealing temperature range generally nearer the crystalline melting point of the homopolymer constituent.

TABLE I

| | | Seal Values of Coated HDPE Films (30 psi., 1 sec. dwell time) | | | | | | |
|---|---|---|---|---|---|---|---|---|
| | | Peel Values (Lbs./In.) | | | | Seal Values (Lbs./In.) | | |
| Sample | Seal Temp. $T^1$ | $T^1 - 10°$ F. | $T^1$ | $T^1 + 10°$ F. | Seal Temp. $T^2$ | $T^2 - 10°$ F. | $T^2$ | $T^2 + 10°$ F. |
| "EVA" | 200 | 0 | 1.2 | 2.8 | 240 | 4.5 | 4.5 | 4.5 |

TABLE I-continued

Seal Values of Coated HDPE Films (30 psi., 1 sec. dwell time)

| Sample | Seal Temp. $T^1$ | Peel Values (Lbs./In.) $T^1 - 10°$ F. | $T^1$ | $T^1 + 10°$ F. | Seal Temp. $T^2$ | Seal Values (Lbs./In.) $T^2 - 10°$ F. | $T^2$ | $T^2 + 10°$ F. |
|---|---|---|---|---|---|---|---|---|
| EVA/WAX | 180 | 1.1 | 1.1 | | 240 | 1.3 | 1.5 | 1.7 |
| 685 | 190 | 0.10 | 0.125 | 0.15 | — | — | — | — |
| 685 | 220 | 0.18 | 0.22 | 0.25 | — | — | — | — |
| 687 | 200 | 0.16 | 0.18 | 0.22 | — | — | — | — |
| 696 | 200 | 0.32 | 0.40 | 0.50 | 240 | 2.9 | 2.9 | 2.9 |
| 700 | 200 | 0.36 | 0.45 | 0.51 | 240 | 0.70 | 0.75 | 0.95 |
| 704 | 180 | 0.35 | 0.46 | 0.63 | 240 | 3.0 | 3.0 | 3.0 |
| 704 | 200 | 0.6 | 0.8 | 1.30 | 240 | 3.0 | 3.0 | 3.0 |
| 705 | 180 | 0.48 | 0.63 | 0.85 | 240 | 3.4 | 3.4 | 3.4 |
| 705 | 200 | 0.85 | 1.15 | 1.80 | 240 | 3.4 | 3.4 | 3.4 |

TABLE II

Composition of Peel-Seal Coating
(0.4 Mil Seal Coating/1.6 Mil 3810.18 HDPE)

| Sample No. | Composition % Components | COF Peel-SealSide/ Peal Seal Side |
|---|---|---|
| 685 | 54% Elvax 260<br>45% 3810.18<br>0.5% SiO₂<br>0.4% PE720<br>0.15% Stearamide | 0.61 |
| 687 | 50% Elvax 260<br>45% 3810.18<br>4.9% 510<br>0.1% Stearamide | 0.57 |
| 694 | — | — |
| 696 | 50% Elvax 260<br>20% 3810.18<br>25% 4005<br>4.9% 510<br>0.1% Stearamide | 0.77 |
| 700 | 53.6% Elvax 260<br>35.7% 3810.18<br>0.2% Stearamide | 0.53 |
| 704 | 55% Elvax 260<br>20% 4005<br>25% 3810.18 | — |
| 705 | 60% Elvax 260<br>15% 4005<br>25% 3810.18 | — |

Notes
3810.18 - HDPE of 0.965 gm/cc density, 40 M.I.
Elvax 260 - A copolymer of 72% ethylene, 28% vinyl acetate, M.I. 5.5–6.0
PE 720 - LDPE, 0.916 gm/cc density, M.I. 7
510 - LDPE, 0.919 gm/cc density, M.I. 2.0
4005 - LDPE, 0.915 gm/cc density, M.I. 5

The heal seal strengths reported in Table I are obtained over a 20° F. sealing range variance as represented by a temperature $T^1$, a lower sealing temperature $T^1$ minus 10° F., and also a sealing temperature higher than the controlled temperature, i.e., $T^1$ plus 10° F. This range is generally accepted as a practical range within which seal temperatures can be controlled in commercial machines. The prior art EVA sample provided a clear cut seal-no seal response over the range tested. The EVA/WAX prior art sample performed in a manner to give a generally uniform 1.1 peel strength reading at the control temperature $T^1$, and at $T^1$ minus 10° F. and $T^1$ plus 10° F. This material would be considered marginal for a peel seal from the standpoint that the peel seal strength is higher than may oftetimes be desired. The strength of this seal might be revised downwardly through incorporating greater amounts of wax in the formulation, but unfortunately a high wax concentration can make it impractical to commercially prepare films of this type using coextrusion techniques. Also the EVA/WAX combination is limited in the sense of the maximum heat sealable strength obtainable as shown at the right hand column of Table I.

Referring now to the remaining samples of Table I, it is shown that films prepared according to these teachings and utilized according to the method of the invention can provide extremely fine control over the strength of the seal in a desirable range of from about 0.1 to about 1 pound peel strength per linear inch. Most desirably the compositions provide a generally dual plateau sealing strength curve at the respective temperatures of $T^1$ and $T^2$, both such control temperatures permitting a variance of at least about plus or minus 10° F. The temperature $T^1$ defines an excellent peel seal, whereas the temperature $T^2$ gives a much stronger seal such that packages with dual seal strengths may be prepared under these teachings using the same heat seal layer.

Also it should be noted that the coefficient of friction of the samples reported is not excessive such that films of generally good machining characteristics may be provided without sacrificing control over the strength of the peel seal. Sample Nos. 685 and 687 are particularly considered advantageous formulations for film applications for overwrapping cheese wherein a light and closely controlled peel seal strength of about 0.2 lbs. per linear inch would be desirable. Sample Nos. 696 and 700 are considered excellent films for use as cereal box liners wherein the liner may be prepared with an easy open peel seal in a desirable range of about 0.3 to about 0.5 lbs. per inch peel strength.

What is claimed is:

1. A method for forming peel seals comprising the steps of utilizing therefor a film comprising at least a two layered laminar structure embodying a polymeric film substrate layer having intimately adhered to one surface thereof a heat seal layer, the heat seal layer comprising essentially a blend of not less than about 10 and up to about 55 parts by weight of an ethylene homopolymer having a density of between about 0.93 to 0.98 gm/cc, and not less than about 45 and up to about 60 parts by weight of a copolymer of from about 65 to 85 weight percent ethylene and from about 15 to 35 weight percent vinyl acetate, bringing opposed portions of the film into contact under pressure with the heat seal layer of such portions positioned in face to face contact, and applying a controlled sealing temperature of the copolymer constituent, but less than the crystalline melting point of the homopolymer constituent to effect a seal strength between said opposed portions of about 1 pound per linear inch in strength or less.

2. A package comprising a flexible package fabricated at least in part from a flexible film comprising at least two layers in intimately adhered laminar form, including a polymeric film substrate layer having intimately adhered to one surface thereof a heat seal layer prepared from a homogeneous blend comprising essentially not less than about 10 and not greater than about 55 parts by weight of an ethylene homopolymer having a density of from between about 0.93 to about 0.98 gms/cc, and not less than about 45 and not greater than about 60 parts by weight of a copolymer of from about 65 to 85 weight percent ethylene and from about 15 to 35 weight percent vinyl acetate, opposed portions of such film being joined by a pressure and heat induced seal utilizing the heat seal layer of each such portion, said seal being characterized by a peel strength in the range from between about 0.1 and about 1.0 pound per linear inch.

* * * * *

UNITED STATES PATENT AND TRADEMARK OFFICE
CERTIFICATE OF CORRECTION

PATENT NO. : 4,252,846

DATED : February 24, 1981

INVENTOR(S) : Floyd E. Romesberg et al.

It is certified that error appears in the above—identified patent and that said Letters Patent is hereby corrected as shown below:

Title page, under "References Cited", eighth reference Lindemann et al., "1/1975" should read -- 1/1973 --;

Column 1, line 63, please delete the word "seal" after "high";

Column 4, line 8, please insert the word -- layer -- after the word "seal";

Column 4, line 47, "opposite" should read -- opposed --;

Columns 5 and 6, Table I-continued, the values listed under the last five column headings for the second sample, "EVA/-WAX" should read -- 1.1; 240; 1.3; 1.5 and 1.7 -- respectively;

Column 6, line 47, "desirable" should read -- desired --.

Signed and Sealed this

Thirtieth Day of June 1981

[SEAL]

Attest:

RENE D. TEGTMEYER

Attesting Officer

Acting Commissioner of Patents and Trademarks